(12) United States Patent
Yount

(10) Patent No.: US 6,367,031 B1
(45) Date of Patent: Apr. 2, 2002

(54) CRITICAL CONTROL ADAPTION OF INTEGRATED MODULAR ARCHITECTURE

(75) Inventor: Larry J. Yount, Scottsdale, AZ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/213,849

(22) Filed: Dec. 17, 1998

(51) Int. Cl.[7] .................................................. H02H 3/05
(52) U.S. Cl. ................................ 714/11; 701/14; 700/4
(58) Field of Search ............................ 714/11, 12, 797, 714/10, 47; 709/222; 700/4, 79; 701/3, 14; 713/200

(56) References Cited

U.S. PATENT DOCUMENTS

| | | | |
|---|---|---|---|
| 4,130,241 A | * 12/1978 | Meredith et al. | 714/10 |
| 4,217,486 A | * 8/1980 | Tawfik et al. | 364/133 |
| 4,622,667 A | * 11/1986 | Yount | 714/11 |
| 4,641,517 A | 2/1987 | Spock et al. | |
| 4,787,041 A | * 11/1988 | Yount | |
| 4,799,159 A | * 1/1989 | Davidson et al. | 701/14 |
| 4,907,232 A | * 3/1990 | Harper et al. | 714/3 |
| 5,361,198 A | 11/1994 | Harmon et al. | |
| 5,491,625 A | 2/1996 | Pressnall et al. | |
| 5,491,787 A | * 2/1996 | Hashemi | 714/11 |
| 5,550,736 A | * 8/1996 | Hay et al. | 701/3 |
| 5,880,954 A | * 3/1999 | Thomson et al. | 364/184 |
| 5,968,185 A | * 10/1999 | Bressoud et al. | 714/10 |
| 6,247,142 B1 | * 6/2001 | Wong et al. | 714/5 |
| 6,317,845 B1 | * 11/2001 | Meyer et al. | 714/23 |

FOREIGN PATENT DOCUMENTS

| | | |
|---|---|---|
| EP | 0 754 991 A1 | 7/1996 |
| EP | 1 014 237 A1 | 12/1999 |
| WO | WO 93/25965 | 12/1993 |

OTHER PUBLICATIONS

Becrow, Jack, Atkinson and Haylock, Fault Tolerant Drives for Safety Critical Applications, 1997, 5/1–5/7.*

* cited by examiner

Primary Examiner—Robert Beausoleil
Assistant Examiner—Rita Ziemer

(57) ABSTRACT

The present invention, Layered Detection Architecture ("LDA") is useful to enhance the detection of command control processing errors and also facilitate survivorship among properly functioning flight critical Core Processing Modules ("CPM") while eliminating faulty CPM responsible for processing execution errors. LDA is contemplated for use with lock-step execution verification schemes and other result comparison command-processing error detection methods also implementing redundant independent processing units.

14 Claims, 4 Drawing Sheets

CRITICAL CONTROL ADAPTION OF INTEGRATED MODULAR ARCHITECTURE

FIELD OF THE INVENTION

The present invention relates to the field of redundancy management of aircraft critical control architectures. More particularly, the present invention relates to multiple layer cross processor error detection for redundant aircraft critical control architectures. Still more particularly, the present invention relates to processor survivorship for a redundant aircraft critical control computer architecture implemented with multiple layer cross processor control command processing error detection.

BACKGROUND OF THE INVENTION

Flight control systems are constrained by Federal Air Regulations to provide safe control of an aircraft throughout the regimes in which the flight control system is utilized. Any failure condition, which prevents continued safe flight and landing, must be extremely improbable. Present regulations require a very low probability of failure per hour for flight critical components. A flight critical portion of a flight control system is one of these critical components, the failure of which endangers the lives of the persons aboard the aircraft. Generally, the safety levels of components of the system is determined by aircraft level analysis, known to those skilled in the art. Analyses of non-critical flight control system elements, however, typically are performed to a much lesser probability level of failures per hour than flight critical portions. For example, components of a flight control system utilized in landing aircraft may be designated as flight critical, whereas, certain components utilized during cruise control may be designated as non-critical.

Flight control systems utilizing analog computers and components had been prevalent in the art wherein it had become completely practical to perform the verification and validation procedures to certify conformance of such systems to the safety requirements of the Federal Air Regulations. A known technique for enhancing the reliability and fault tolerance of flight critical components is that of dual redundancy. Dual redundancy is the utilization of two identical channels monitoring to detect a failure in one of the channels. Although such systems are effective against random faults, cross channel monitoring does not provide effective detection of generic faults. A generic fault is defined as a fault that is inadvertently designed into a component such that all like components generically have this fault and respond in like but defective manners. When identical components having a generic fault are in respective redundant channels, the cross channel monitoring compares the same, although erroneous output from both channels, and therefore does not detect the error.

Such prior art dual redundant systems with identical channels provided fail passive performance with respect to random faults. When the cross-channel monitoring detects different outputs from the two channels, the dual channel flight control system is disengaged thereby failing in a passive manner. In order to effect fail operational performance with respect to random faults, two such dual redundant channel pairs were conventionally utilized whereby a miscomparison in one pair would result in shut down of that pair with the other channel pair remaining in operation. The occurrence of a second random fault in a remaining channel pair would affect passive shutdown of the system. For the reasons discussed above, such multiple redundant systems were ineffective in detecting generic faults.

In order to overcome these problems, the automatic flight control technology has advanced to the concept of dissimilar redundancy. In dissimilar redundancy, dual dissimilar processors perform identical tasks utilizing dissimilar software with cross channel monitoring to detect failures. With this approach, generic errors designed into the processor or software of one channel will not exist in the processor or software of the other channel and the cross channel monitoring will detect the discrepancy. Such prior art dual dissimilar processor systems would be fail passive with respect to both random and generic faults. A random or generic fault occurring with respect to one of the dissimilar processors would be detected by the cross channel monitoring and the dual dissimilar processor system passively disengaged.

None of the related art system configurations mentioned above provide fail operational performance with respect to generic faults. Utilization of multiple dual redundant systems with similar processing elements fails to detect generic faults for the reasons discussed above. A mirror replication of dual channel subsystems utilizing dissimilar processing elements would result in a fail passive capability rather than a fail operational performance. This is because a generic fault detected in one dual subsystem causing that subsystem to be disengaged would be present in corresponding element in any other subsystem, also resulting in disengagement thereof. Thus, this dual dissimilar configuration instead of providing fail operational performance results in a fail passive system that is the property otherwise obtained from one half of the system.

U.S. Pat. No. 4,622,667 issued to Yount and entitled "Digital Fail Operational Automatic Flight Control System Utilizing Redundant Dissimilar Data Processing" describes an arrangement which provides fail operational performance for a first random or generic failure and fail passive performance for a second random or generic failure. An alternative embodiment in Yount provides fail operational performance for the first two random failures and fail passive performance for a third random failure and provides fail operational performance for the first generic failure and fail passive performance for the second generic failure.

The fail operational arrangement of Yount utilizes at least two independent flight control channels, each composed of two lanes. Each lane is comprised of independent I/O. One lane in each channel includes a first digital data processor and the other lane includes a second data digital processor with an active third processor. The two lanes in each channel are cross-monitored to detect disagreements between the outputs of the first and second processors and the outputs of the first and third processors. All the processors perform the same system tasks with respect to flight critical functions. The three processors in each channel provide dissimilar data processing with respect to each other. The two processors that do not have active third processors associated therewith in the respective subsystems provide dissimilar data processing with respect to each other.

The six processors of the two channels in Yount are arranged so that there are only three types of dissimilar data processing. When the cross monitoring in a channel detects a discrepancy between the outputs of the first and second processors, the output of the second processor is disabled and the active third processor continues servicing its channel. If the cross monitoring in a channel detects a discrepancy between the outputs to the first and second processors, the entire channel is disengaged. In effect, the third processor of the channel is substituted for the second processor when the second processor is detected to be defective, and if the substitution does not resolve the discrepancy, the channel is disengaged. In the alternative embodiment, the arrangement is fail operational for the first two random failures and fail passive for a third random failure and which is fail operational for the first generic failure and fail passive for the second generic failure, the arrangement utilizes three channels in a somewhat similar manner.

In another flight critical computer architecture, and internal monitoring mechanism of the MD-11 Flight Control Computer having a dual lane computer channel with two processors per lane is apparent. The MD-11 Flight Control Computer is a dual lane computer with two processors in the first lane and two processors in a second lane. With the MD-11 Flight Control Computer, one of the processors in one lane, is locked out so that it is unable to output flight critical commands. No comparison monitoring is performed with the locked out processor so the MD-11 configuration is redundant in only one lane, i.e. the second lane. Therefore, each MD-11 flight critical computer incorporates a fail passive design since a single processor fault in the non redundant lane can shut down the flight control computer.

A single channel fail operational flight critical computer system for aircraft is described in U.S. Pat. No. 5,550,736 issued to Hay et al ("Hay"). The Hay patent describes a flight critical computer system based on dual independent computing lanes with a primary and a redundant processor in each lane. Each dual independent computing lane produces command signals generated by the primary and the redundant processors. Three independent monitors are provided to monitor the command signals produced by the first primary and the second primary, the second primary and the first redundant, and the first primary and the second redundant, respectively. Selection logic completes the system and selects from the first, second and third comparison signals at least one of the output signals generated by the processors as a command signal of the system. This permits at least one processor to fail before both command signals from the lanes, respectively, are disabled.

The related art inventions heretofore described are all useful to provide fault tolerant flight critical computer architectures. However, past precedent also suggests the need for clear physical separation between redundant computing lanes. Therefore, a need exists for aircraft critical control computer modular architecture that provides segregated independent processing units. Moreover, a further need exists for a aircraft critical control computer modular architecture that provides fail-operational or at least fail-passive performance.

SUMMARY OF THE INVENTION

It is an object of the present invention to provide a redundant aircraft critical control modular architecture featuring cross processor error detection and fail operational processor survivorship.

BRIEF DESCRIPTION OF THE DRAWINGS

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with the accompanying drawings wherein:

DESCRIPTION OF PREFERRED EMBODIMENTS

While these descriptions directly describe the above embodiments, it is understood that those skilled in the art may conceive modifications and/or variations to the specific embodiments shown and described herein. Any such modifications or variations that fall within the purview of this description are intended to be included therein as well. It is understood that the description herein is intended to be illustrative only and is not intended to be limitative. Rather, the scope of the invention described herein is limited only by the claims appended hereto.

Aircraft designers of modem day command control systems use modular computer architectures to implement redundant critical control systems and also to facilitate efficient and relatively inexpensive maintenance of said systems. This style of architecture, an Integrated Modular Architecture ("IMA") 1, generally comprises multiple Core Processing Modules ("CPM") 20 mounted within a cabinet to implement aircraft critical control functionality. Critical control functionality refers to those functions, the failure of which endangers the lives of persons aboard the aircraft.

A CPM 20 typically features at least single redundancy accomplished by at least two independent parallel-processing units 21. In response to aircraft control commands, each parrallel-processing unit 21 of the CPM 20 executes the same commands independently. Thereafter, the execution results of each processing unit 21 are compared with the execution results of the other said processing unit 21 using various schemes to detect processing errors. This method of monitoring the execution of control commands is well known in the art and is hereinafter referred to as lockstep execution verification 2. One such method of lock-step execution verification 2 performs a Boolean AND operation 241 upon the command processing results. For reference, FIG. I depicts a block diagram representation of a prior art CPM 20 featuring single redundancy and using lock-step execution verification 2. The present invention, Layered Detection Architecture 10 ("LDA") is useful to enhance the detection of command control processing errors and to also facilitate survivorship among properly functioning CPM 20 while disabling faulty CPM 20 responsible for execution errors. LDA 10 is contemplated for use with lock-step execution verification 2 schemes and other result comparison command-processing error detection methods also implementing redundant processing units 21.

Figure 2:
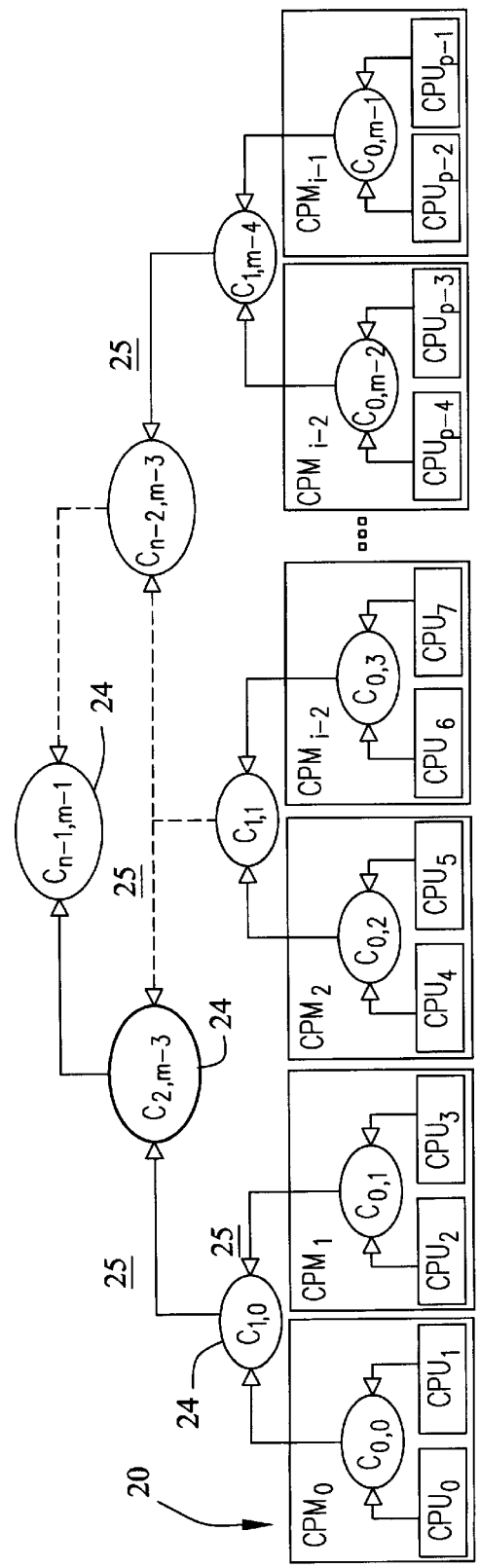
FIG. 2 depicts the generic Layered Detection Architecture with an even number Core Processing Module.

The present invention, LDA 10, comprises CPM 20 survivorship for critical control aircraft IMA 1 based on a multiple cross-coupled CPM 20 and unlimited n-layer command control processing-error detection. FIG. 2 depicts a generic illustration of the preferred embodiment using LDA 10 within the control command processing functionality of an aircraft. Preferably, each CPM 20 will be electrically and physically isolated to reduce the probability of system wide noise generated faults. The particular means of electrical and physical isolation can vary according to the IMA 1. Moreover, alternate schemes would be apparent to an ordinarily skilled practitioner.

Figure 1:
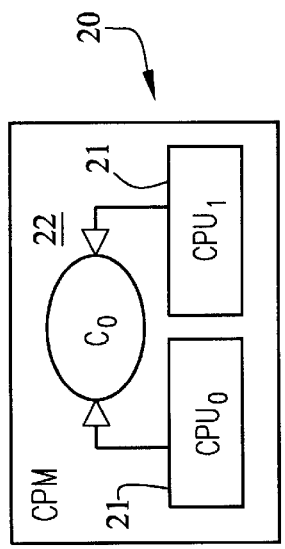
FIG. 1 is a depiction of a singular Core Processing Module of the prior art featuring single redundancy and a Comparison Function.

The preferred embodiment LDA 10 depiction of FIG. 2 depicts bus-comparison functions, $C_{0,0} \ldots C_{0,m-1}$ 22 where m=0, 1, 2, 3 ..., performing the prior art result comparison function depicted by FIG. 1. Said comparison is performed between multiple independent processing unit 21 pairs designated $CPU_0$ and $CPU_1 \ldots CPU_{p-2}$ and $CPU_{P-1}$ where p=0, 1, 2, 3 ... and is equal to the number of independent processing units 21. Thereafter, LDA 10 implements higher layer comparison functions 24, designated $C_{1,0} \ldots C_{n-1,m-1}$ where n=0, 1, 2, 3, ..., and n represents the number of layers that perform result comparison error detection: 1) between the multiple comparison and annunciation functions of the prior art, $C_{0,0} \ldots C_{0,m-1}$ 22; and 2) between respectively lower layers of said higher layer comparison and annunciation functions 24, designated $C_{1,0} \ldots C_{n-1,m-2}$.

Figure 3:
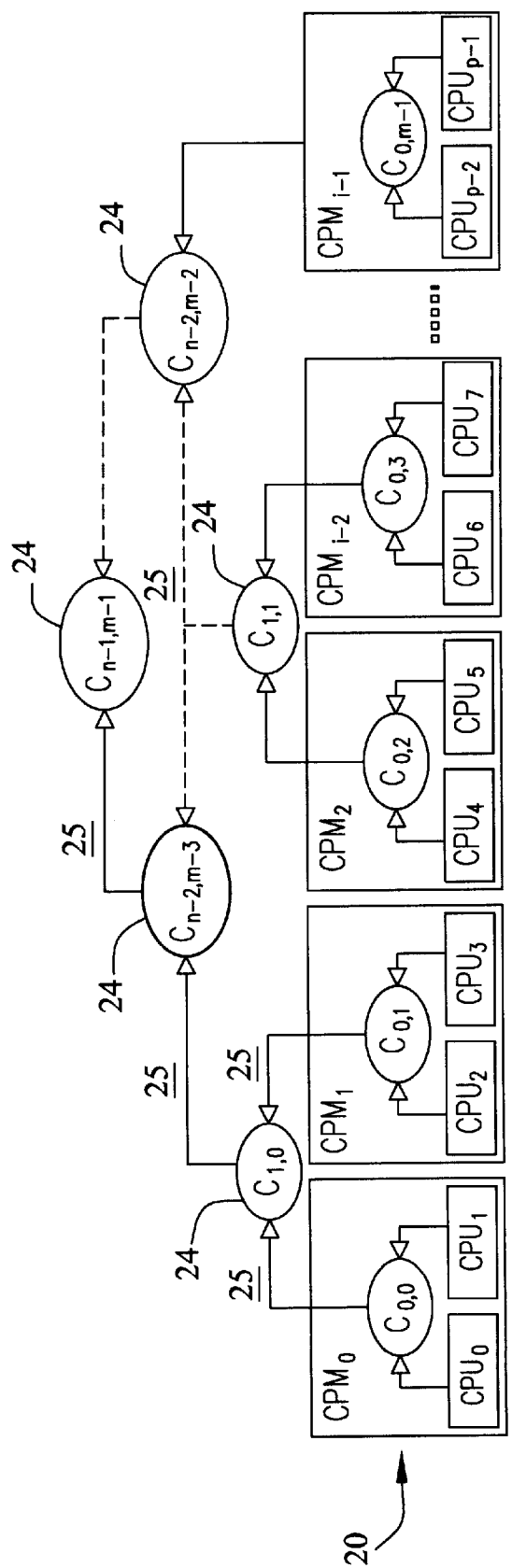
FIG. 3 depicts the generic Layered Detection Architecture with an odd number Core Processing Module.
Figure 4:
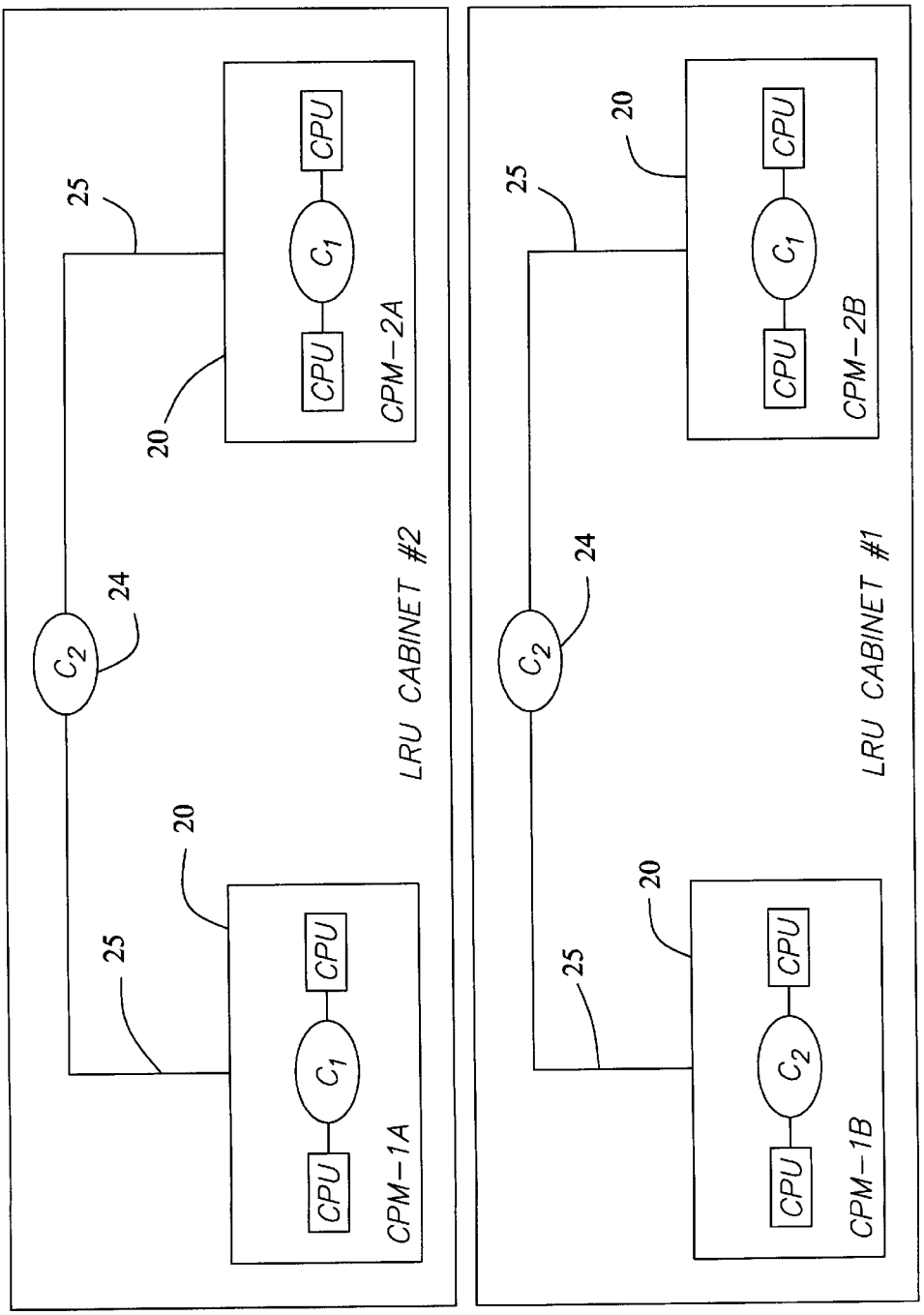
FIG. 4 depicts a block diagram of a modular aircraft computer architecture wherein dual independent Layered Detection Architecture exists within separate computing cabinets.

Alternate LDA 10 structures and alternate LDA 10 features are also contemplated for use with the present invention. For instance, FIG. 3 depicts an LDA 10 implemented with an odd number of CPM 10 and FIG. 4 depicts a redundant LDA 10 structure wherein each independent LDA 10 exists within physically and electrically isolated IMA 1 computing cabinets 18. Another feature contemplated for inclusion in the preferred embodiment of the present invention is a fault-tolerant data transmission channel 25. For instance, the preferred LDA 10 implementation uses the proprietary SafeBus™ as the data transmission channel 25 to cross couple the CPM 20 within the LDA 10.

LDA 10 also contemplates the use of mixed error detection schemes between cross coupled CPM 20 pairs in one layer or in alternate layers. For instance, and again with reference to FIG. 2, the comparison function $C_{2,m-3}$ 22 could perform a time-error-magnitude operation 240 upon the processing results while the comparison functions $C_{1,0}$ and $C_{1,1}$ 22, perform a Boolean AND operation 241 upon the processing results.

Time-error-magnitude operation 240 is performed by detecting differences between the result comparison functions 22, $C_{1,0}$ and $C_{1,1}$, and multiplying this error by the extent of time the difference exists to generate a time-error-product magnitude. If the time-error-product magnitude exceeds a threshold limit, an error is flagged for appropriate action. i.e. removing the offending CPM 20 from the critical control functionality of the aircraft. Thus, LDA 10 accords flexibility in both the actual critical control functionality architecture and in the error detection result comparison schemes.

Figure 5:
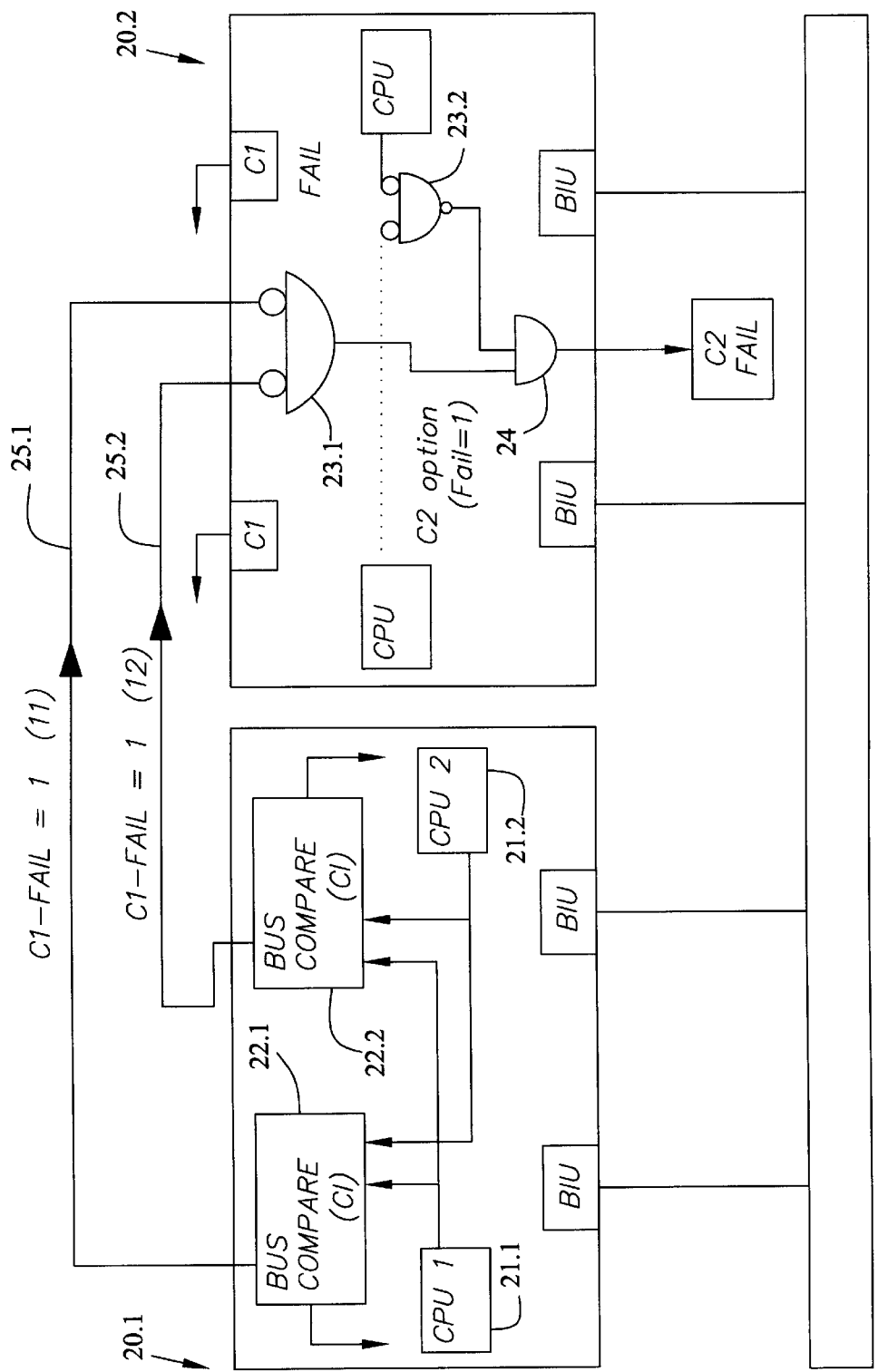
FIG. 5 depicts Layered Detection Architecture embodied with Cross Core Processing Module Monitoring with Survivorship.

A particular implementation of the preferred LDA 10 is depicted in FIG. 5. This depiction illustrates more detail in an embodiment implementing 2 layer LDA 10 featuring Cross-CPM Monitoring with CPM Survivorship. The first layer of processing error detection, within both a first CPM 20.1 and a second CPM 20.2, is implemented with the bus-comparison functions 22.1 and 22.2 (not shown in the second CPM 20.2). The bus-comparison functions 22.1 and 22.2 perform lock-step execution verification 2 by performing a bit-for-bit comparison of the independent processing unit 21.1 and 21.2 command execution results. Although each CPM 20.1 and 20.2 has equivalent hardware, FIG. 5 shows each CPM 20.1 and 20.2 having only a portion of the actual hardware within each CPM 20.1 and 20.2.

The second layer of the LDA 10 depicted in FIG. 5 is implemented with a first layer annunciation function 23.1 and a second layer annunciation device 24. In the depiction, the second layer comparison and annunciation device 24 examines the state of the first layer annunciation device 23.1 and the bus-comparison processing results of the second CPM 20.2 to announce a second layer fault. Equivalently, but not shown, the same functionality is implemented in the first CPM 20.1.

In FIG. 5, the first layer annunciation device 23.1 of the embodiment is an inverted-input AND gate with inputs the coupled to dual annunciation paths I1 25.1 and I2 25.2. The dual paths implement the fault-tolerant communication channel 25 and prevent an electrical fault on one of said paths from blocking the annunciation of a detected processing error. For ease of reading, the dual annunciation paths from the second CPM 20.2 to the first CPM 20.1 are not shown but also exist in the embodiment.

Said annunciation device 23.1 announces that the cross coupled CPM 20.1 has detected a processing error and should be disqualified from both further command processing and cross CPM 20 result comparison operations. Additionally, FIG. 5 depicts the second layer annunciation device 24 as an AND gate with one input coupled to the first layer annunciation device 23.1 of the first CPM 20.1 and one input coupled to the bus-comparison function 22.1 and 22.2 of the second CPM 20.2. FIG. 4 actually depicts an inverted-input-negated-output AND gate as the representation of one-half of the bus-comparison function 22.1 and 22.2.

As implemented, the first CPM 20.1 can announce the detection of a local processing error while monitoring the second CPM 20.2 for remote processing errors, and vice versa. Thus, if one of the independent processing units 21 of either the first CPM 20.1 or the second CPM 20.2 singularly announce a processing error via cross CPM 20 monitoring, the respective CPM 20 can be disqualified and disabled from further command processing. Additionally, if both independent processing units 21.1 and 21.2 of the first CPM 20.1 or the second CPM 20.2 execute the same error during a control command, then the second layer of the embodied LDA 10 will detect that error by comparison of the command execution results in the second CPM 20.2 or the first CPM 20.1, respectively. Therefore, the embodiment of FIG. 5 is fail-operational for a first random fault occurrence within one CPM 20.1 or 20.2, and fail-passive for a first generic fault occurrence within one CPM, 20.1 or 20.2. Moreover, it is clear that an LDA 10 with existing layers and equivalent hardware can be fail-operational for more random and generic faults.

What is claimed is:

1. An aircraft flight command modular computer architecture comprising;

a. at least two independent core processing modules, each coupled to b. a higher layer comparison and annunciation function, by c. a fault-tolerant data transmission path, whereby said at least two independent core processing modules perform independent processing of the aircraft control commands and the comparison and annunciation function compares the results of said processing to detects differences in said processing results.

2. The aircraft flight command modular computer architecture of claim 1 wherein the comparison operation performed by the higher layer comparison and annunciation function upon the processing results is a Boolean AND operation.

3. The aircraft flight command modular computer architecture of claim 1 wherein the comparison operation performed by the higher layer comparison and annunciation function upon the processing results is a time magnitude operation.

4. The aircraft flight command modular computer architecture of claim 1 wherein said at least two independent core processing modules and another at least two independent core processing modules are physically and electrically isolated from each other in separate computing cabinets so as to reduce the probability of simultaneously occurring processing faults.

5. The aircraft flight command modular computer architecture of claim 1 wherein each of said at least two independent core processing modules further comprise at least a first independent processing unit and a second independent processing unit, each coupled to at least one bus-comparison and annunciation function, wherein each independent processing unit executes aircraft control commands and the at least one bus-comparison function performs lock-step execution verification on the executed aircraft commands.

6. An integrated modular aircraft control computer architecture comprising;
   a. a first core processing module comprising,
      i. a first layer comparison and annunciation function that performs lock-step execution verification and announces processing failures executed in said first core processing module, and
      ii. a second layer comparison and annunciation function existing within said first core processing module that announces processing failures executed in said second core processing module, and
   b. a second core processing module possessing equivalent processing functionality to said first core processing module and comprising,
      i. a first layer comparison and annunciation function that performs lock-step execution verification and announces processing failures executed in said second core processing module, and
      ii. a second layer comparison and annunciation function existing within said second core processing module that announces processing failures executed in said first core processing module, and
   c. a fault-tolerant data transmission path, coupling said first and second core processing modules,
whereby said at least two independent core processing modules perform independent processing of aircraft control commands and the comparison and annunciation function compares the results of said independent processing, detects processing differences of said aircraft control commands, announces said detected processing differences and disables one or both core processing modules.

7. The integrated modular aircraft control computer architecture of claim 6 wherein the first core processing module and the second core processing module are electrically and physically isolated from each other so as to reduce the probability of simultaneous faults between said first and second core processing modules.

8. The integrated modular aircraft control computer architecture comprising of claim 6 wherein said first and second core processing modules are electrically and physically isolated from each other to reduce the probability of simultaneous faults in both of said core processing modules.

9. The integrated modular aircraft control computer architecture of claim 6 wherein said second layer comparison and annunciation function performs lock-step execution verification operations on the processing results.

10. The integrated modular aircraft control computer architecture of claim 9 wherein said lock-step execution verification operation is a Boolean AND operation.

11. The integrated modular aircraft control computer architecture of claim 6 wherein said second layer comparison and annunciation function performs time-error-magnitude operation on the processing results of said first and second core processing modules.

12. A method of preserving operation of at least one core processor module on an aircraft, the method comprising the steps of:
   a. introducing at least two core processing modules, each core processing module configured to independently process and execute aircraft control commands,
   b. coupling, through a data transmission path, each core processing module to at least a first higher layer comparison and annunciation function, each comparison and annunciation function configured to compare the processing results of each of said core processing modules to detect differences in said processing results, and
   d. allowing at least the first higher layer comparison and annunciation function to disable each core processing module when said difference is detected.

13. The method of claim 12 further comprising the step of introducing a comparing operation in the higher layer comparison and annunciation function, the comparison operation being a time magnitude operation.

14. The method of claim 13 wherein each higher layer comparison and annunciation function further performs lock-step execution verification and announces processing failures.

* * * * *